Oct. 10, 1967     O. E. LIENHARD     3,346,751
CLAMPED SEAL FOR HIGH PRESSURE GAS DISCHARGE LAMP
Filed Oct. 1, 1963
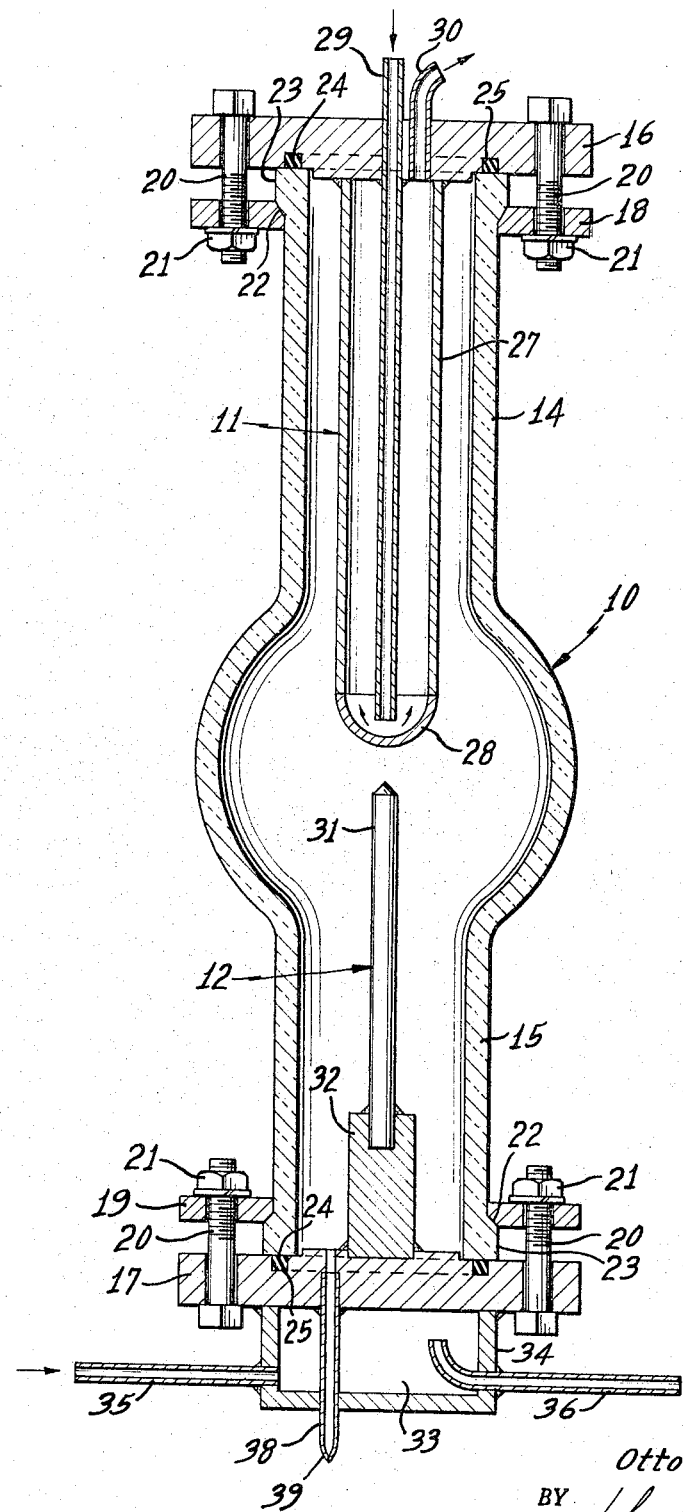
INVENTOR.
Otto E. Lienhard
BY John K. Conant
ATTORNEY

United States Patent Office 3,346,751
Patented Oct. 10, 1967

3,346,751
CLAMPED SEAL FOR HIGH PRESSURE GAS DISCHARGE LAMP
Otto E. Lienhard, Upper Montclair, N.J., assignor to Engelhard Hanovia, Inc., Newark, N.J., a corporation of New Jersey
Filed Oct. 1, 1963, Ser. No. 313,007
2 Claims. (Cl. 313—32)

The present invention relates to high pressure gas discharge lamps and particularly to a lamp of this type having improved means for sealing the electrodes in the lamp envelope and for cooling the electrodes.

In high pressure gas discharge lamps—and particularly in the electrode stabilized types which are referred to as compact arc lamps—up to 30% of the input energy is transformed into heat at the electrodes with most of the heat being created at the anode. With the amount of heat involved it is a problem to construct lamps which will withstand the heat and to secure the metal electrodes through the glass or quartz lamp envelope with seals which will not crack or open up due to unequal thermal expansion of the electrodes and the envelope.

In order to dissipate the heat as much as possible the electrodes, and particularly the anode, are made larger and bulkier than required to carry the current used and they are normally made of tungsten which will not melt under the temperatures involved. Tungsten however is expensive and difficult to work so that the provision of bulky tungsten electrodes as a means of dissipating the heat is costly. In addition with larger size lamps this method of heat dissipation is ineffective in keeping the temperature below the melting point of the glass or quartz of the lamp envelope which limits the size of this type of lamp. In practice a compact arc lamp of around 10 kilowatts is about the largest size that is practical with this conventional type of construction.

Lamps have been constructed with electrodes cooled by circulating a liquid coolant, normally water through the electrodes which permits higher operating wattages without breaking down the electrodes. High temperatures, however, are still generated within the lamp envelope and the seals of the electrodes through the envelope are subjected to severe stresses due to the unequal thermal expansion of the electrodes and envelope materials.

A conventional seal construction to compensate for the effect of thermal expansion is the "graded seal" in which several layers of glass are interposed between the metal of the electrodes and the glass or quartz of the lamp envelope. The layers of glass are selected to provide graduated degrees of thermal expansion. The layer in contact with an electrode has a thermal expansion approaching the thermal expansion of the electrode. The next layers have progressively smaller degrees of thermal expansion and the layer in contact with the main body of the envelope has the smallest degree of thermal expansion which is close to the extremely small amount of thermal expansion of the usual envelope material. Three or four of more such intermediate layers are usually required and it will be appreciated that this type of construction is costly. Moreover, when the thermal expansion differential is large, as in the larger lamps these seals are not dependable and crack quite easily.

It is therefore an object of the present invention to provide a high pressure gas discharge lamp having a simple but effective construction for cooling the electrodes and for securing the electrodes in the lamp envelope with a tight seal which is not subject to cracking or opening due to thermal expansion. The construction of the present invention thus makes it possible to provide more dependable and less costly compact arc lamps than with previous constructions. But it is of even greater significance that with the construction of this invention much larger compact arc lamps may be fabricated than heretofore possible.

In accordance with the invention the lamp envelope, which is glass or quartz, has two generally tubular portions open at their outer ends. The electrodes are secured on plates which are clamped over the openings with the electrodes extending into the lamp envelope. The seal between the lamp envelope and the plates are made tight by rubber O rings or gaskets around the openings in the envelope and the clamping means which secure the plates to the lamp envelope. The clamping means may be collars around the tubular portions bearing against annular shoulders at the openings and attached respectively to the plates by bolts which are tightened to compress the O rings or gaskets and make the seal.

The anode which generates the most heat is a hollow tube with inlet and outlet conduits through the adjacent plate into the hollow portion of the electrode. Liquid coolant — normally water — may thus be circulated through the center of the electrode to effectively dissipate the heat.

The cathode does not generate as much heat as the anode and it is effectively cooled by circulating coolant through a chamber which is a part of the plate to which the cathode is attached. The electrical connections to the electrode may be provided by terminals on the plates which are suitably made of brass.

Further objects, advantages and details of the lamp of this invention will be apparent from the following description and accompanying drawing which is a longitudinal section through the lamp.

Referring now to the drawing the high pressure lamp in accordance with this invention comprises a lamp envelope 10 filled with an inert gas, such as xenon, under pressure and having a pair of electrodes 11 and 12 spaced apart therein. The lamp shown is of the compact arc type which is operated with direct current. The current therefore flows in one direction only and in the embodiment shown the electrode 11 is an anode and the electrode 12 is a cathode.

The lamp envelope 10 has a pair of generally tubular portions 14 and 15 which are open at their outer ends with plates 16 and 17 secured over the openings. The anode 11 and cathode 12 are attached respectively to plates 16 and 17 and extend into the envelope 10 with their inward ends spaced apart.

The plates 16 and 17 are secured and sealed across the open ends of the envelope 10 by means of collars 18 and 19 to which the plates are secured by a plurality of bolts 20 and nuts 21. The collars 18 and 19 fit snugly around the tubular portions 14 and 15 of the envelope 10 and have beveled edges 22 which bear against enlarged annular shoulder portions 23 around the outer end of each of the tubular portions of the envelope. The bolts 20 extend through holes in the plate 16 and 17 and collars 18 and 19 and are secured through the collars by the nuts 21. An O ring 24 or other suitable gasket in a groove 25 is provided in each of the plates 16 and 17 to compress against the edges of the open ends of the tubular portions 14 and 15 and seal the lamp envelope 10 when the bolts and nuts 20 and 21 are tightened to secure the plates 16 and 17 in position.

The anode 11 is hollow and may be formed by welding a closed end tube to the plate 16. In the preferred embodiment the body portion 27 of the anode 11 is a copper tube with a copper cap 28 brazed to the inward or lower end of the tube to form the tip of the anode. For lamps with a rated power of more than 2 kilowatts it may be necessary to use molybdenum or tungsten for the anode cap 28 instead of copper.

An inlet tube 29 and an outlet tube 30 are welded through the plate 16 and provide inlet and outlet conduits to the hollow interior of the anode through which a liquid coolant, usually water, is circulated to dissipate the heat generated at the anode. Any conventional means may be used to circulate the liquid coolant through the conduits and the anode.

The cathode 12 comprises a tip portion 31 which is a rod seated and brazed in a base member 32 which is in turn brazed to the plate 17. The tip portion 31 is made from a refractory metal such as tungsten, thoriated tungsten or tantalum, and the base member 32 is normally made of copper.

The cathode 12 does not generate as much heat as the anode 11 and it is cooled satisfactorily by circulating a liquid coolant (e.g. water) through a chamber 33 adjacent the plate 17. The chamber 33 is formed by a cup 34 secured to the plate. An inlet tube 35 and an outlet tube 36 are fixed through the walls of the cup 34 and provide inlet and outlet conduits for circulating the liquid coolant through the chamber by conventional means.

When the lamp has been assembled and the plates 16 and 17 sealed in position by tightening the bolts 20 and nuts 21, the lamp envelope is then evacuated through a tube 38 which is attached through the cup 34 and the plate 17 and filled with gas to the desired pressure by conventional techniques well known in the lamp industry. When the desired pressure has been built up in the lamp envelope the tube 38 is pinched off as indicated at 39.

In practice, the plates 16 and 17 are made of brass and current to operate the lamp is provided by attaching conductors from a suitable source of electric power to the plates 16 and 17. The conductors may be secured under the heads of the bolts 20 or other terminal connections may be provided.

A high pressure arc lamp in accordance with this invention may be constructed to have both electrodes the same as either the anode 11 or cathode 12 described above. The described construction of the anode 11 is however more complex and expensive than the construction of the cathode 12 and while the cooling arrangement described for the anode 11 provides a better dissipation of heat than the cooling arrangement described for the cathode 12, the cathode does not generate nearly as much heat as the anode and this comparatively less efficient cooling arrangement is quite satisfactory for the cathode. Therefore in the preferred embodiment described, the more expensive but more effectively cooled electrode construction is used for the anode and the less expensive, though less efficiently cooled electrode construction provides a suitable cathode to pair with the anode.

It will be appreciated that certain modifications may be made in the structure and arrangement of the high pressure gas discharge lamp of this invention without departing from the spirit and scope of the invention defined by the following claims.

What is claimed is:

1. A high pressure gas discharge lamp comprising a quartz lamp envelope having a pair of generally tubular portions open at their outer ends with an enlarged annular shoulder portion around the outer edge of each of the outer ends, a collar around each of the tubular portions and bearing against said shoulder portions, an electrically conductive plate across each of the open ends of said tubular portions, seal means between the plates and adjacent edges of said open ends, clamp means between the collars and the plates securing the plates against said open ends, a pair of electrodes with one electrically conductively secured to one plate and the other electrically conductively secured to the other end plate and both extending into the lamp envelope through the respective open ends, one of said electrodes being a hollow anode electrode with inlet and outlet conduits through the adjacent plate into the hollow portion of the electrode for the circulation of liquid coolant through the electrode, the other electrode being a substantially solid cathode electrode and means for liquid cooling said cathode electrode.

2. A high pressure gas discharge lamp according to claim 4 comprising a chamber adjacent the plate to which the cathode electrode is attached, said means for liquid cooling said cathode electrode being conduit means for conducting liquid coolants through said chamber.

References Cited

UNITED STATES PATENTS

| | | | |
|---|---|---|---|
| 1,097,552 | 5/1914 | Kramer | 313—42 |
| 1,230,708 | 6/1917 | Hewitt | 313—32 |
| 3,229,145 | 1/1966 | Jensen | 313—237 |
| 3,256,383 | 6/1966 | Sasrov | 313—237 X |

DAVID J. GALVIN, *Primary Examiner.*